US011951063B2

(12) United States Patent
Emanuelli et al.

(10) Patent No.: US 11,951,063 B2
(45) Date of Patent: Apr. 9, 2024

(54) ARAY HEATED ROLLER

(71) Applicants: Eduardo Emanuelli, Guaynabo, PR (US); Marco Perry, New York, NY (US); Mark Prommel, New York, NY (US); Pil-Ho Chung, New York, NY (US); Michael Berger, New York, NY (US); Cody Moore, New York, NY (US)

(72) Inventors: Eduardo Emanuelli, Guaynabo, PR (US); Marco Perry, New York, NY (US); Mark Prommel, New York, NY (US); Pil-Ho Chung, New York, NY (US); Michael Berger, New York, NY (US); Cody Moore, New York, NY (US)

( * ) Notice: Subject to any disclaimer, the term of this patent is extended or adjusted under 35 U.S.C. 154(b) by 231 days.

(21) Appl. No.: 17/453,245

(22) Filed: Nov. 2, 2021

(65) Prior Publication Data

US 2022/0079837 A1 Mar. 17, 2022

Related U.S. Application Data

(63) Continuation-in-part of application No. 16/559,303, filed on Sep. 3, 2019, now abandoned.

(60) Provisional application No. 63/147,978, filed on Feb. 10, 2021, provisional application No. 63/111,245, filed on Nov. 9, 2020.

(51) Int. Cl.
*A61H 15/02* (2006.01)
*A61H 15/00* (2006.01)

(52) U.S. Cl.
CPC ..... *A61H 15/02* (2013.01); *A61H 2015/0014* (2013.01); *A61H 2201/0207* (2013.01)

(58) Field of Classification Search
CPC ............ A61H 15/02; A61H 2015/0014; A61H 2201/0207; A61H 2201/0228; A61H 2201/1635; A61H 2201/169; A61H 15/0092; A61H 15/00; A61H 2201/0214; A61H 2201/0257; A61H 2201/1284; A61H 2201/0278; A61F 7/02; A61F 2007/0207; A61F 7/034; A61F 2007/0285
See application file for complete search history.

(56) References Cited

U.S. PATENT DOCUMENTS

| | | | | | |
|---|---|---|---|---|---|
| 800,018 | A * | 9/1905 | Ridd | F23C 99/00 | 432/88 |
| 2,104,429 | A * | 1/1938 | Lipsner | A61H 15/0092 | 601/118 |
| 4,884,560 | A * | 12/1989 | Kuracina | A61H 15/0092 | D24/207 |
| 5,025,777 | A * | 6/1991 | Hardwick | F24V 30/00 | 607/104 |
| 5,478,988 | A * | 12/1995 | Hughes | F25D 3/00 | 426/243 |

(Continued)

*Primary Examiner* — Garrett K Atkinson
(74) *Attorney, Agent, or Firm* — Luis Figarella

(57) ABSTRACT

A cordless portable composite foam roller generates and applies heat and/or cold to muscles, and operates using an internal rechargeable power source combined with a flex-proof heating layer when in use. The cordless foam roller includes an elongated cylindrically-shaped body having a sandwich of heating layer(s) and textured exterior surface, and an inner cavity for hosting the rechargeable power source components.

7 Claims, 12 Drawing Sheets

(56) References Cited

U.S. PATENT DOCUMENTS

| | | | | |
|---|---|---|---|---|
| 6,129,687 | A * | 10/2000 | Powell | A61H 15/02 220/666 |
| 6,398,694 | B1 * | 6/2002 | Bountourakis | A63B 21/00069 601/134 |
| 6,623,835 | B2 * | 9/2003 | Chang | A63B 71/08 2/24 |
| 6,648,904 | B2 * | 11/2003 | Altshuler | A61F 7/02 492/46 |
| 6,793,636 | B1 * | 9/2004 | Pepera | A61H 15/02 D24/207 |
| 7,112,178 | B1 * | 9/2006 | Roozenburg | A63B 21/4033 601/19 |
| 7,137,926 | B2 | 9/2006 | Barrows | |
| 8,500,663 | B2 * | 8/2013 | Godfrey | A61H 15/0078 601/60 |
| 9,968,513 | B1 * | 5/2018 | Marton | A61H 23/0263 |
| 11,278,468 | B2 * | 3/2022 | Davis | A61H 15/02 |
| 2003/0077407 | A1 * | 4/2003 | Chang | A41D 13/065 428/34.1 |
| 2008/0200851 | A1 * | 8/2008 | Faussett | A61H 15/0092 601/118 |
| 2011/0152035 | A1 | 6/2011 | Wahl | |
| 2011/0245741 | A1 * | 10/2011 | L'Homme | A61H 15/0085 601/120 |
| 2012/0035029 | A1 * | 2/2012 | Dye | A63B 21/4033 482/132 |
| 2012/0209154 | A1 * | 8/2012 | Williams, III | A61H 23/02 601/19 |
| 2012/0209363 | A1 * | 8/2012 | Williams, III | A61F 7/02 607/114 |
| 2012/0265106 | A1 * | 10/2012 | Accardo | A61H 15/0092 601/123 |
| 2013/0085426 | A1 * | 4/2013 | Brodsky | A61N 5/0619 601/128 |
| 2013/0184620 | A1 * | 7/2013 | Cohen | A61H 15/02 601/118 |
| 2014/0371639 | A1 * | 12/2014 | Diecidue | A61H 15/00 601/19 |
| 2016/0279018 | A1 * | 9/2016 | Egan | A61H 15/02 |
| 2016/0310352 | A1 * | 10/2016 | Chen | A61H 15/0092 |
| 2017/0020774 | A1 * | 1/2017 | Rocklin | A61H 15/0085 |
| 2017/0216130 | A1 * | 8/2017 | Jones | A61H 7/001 |
| 2018/0049941 | A1 * | 2/2018 | Venezia | A61N 5/06 |
| 2018/0207055 | A1 * | 7/2018 | Davis | A61F 7/007 |
| 2019/0159958 | A1 * | 5/2019 | Reycroft | A61H 15/02 |

* cited by examiner

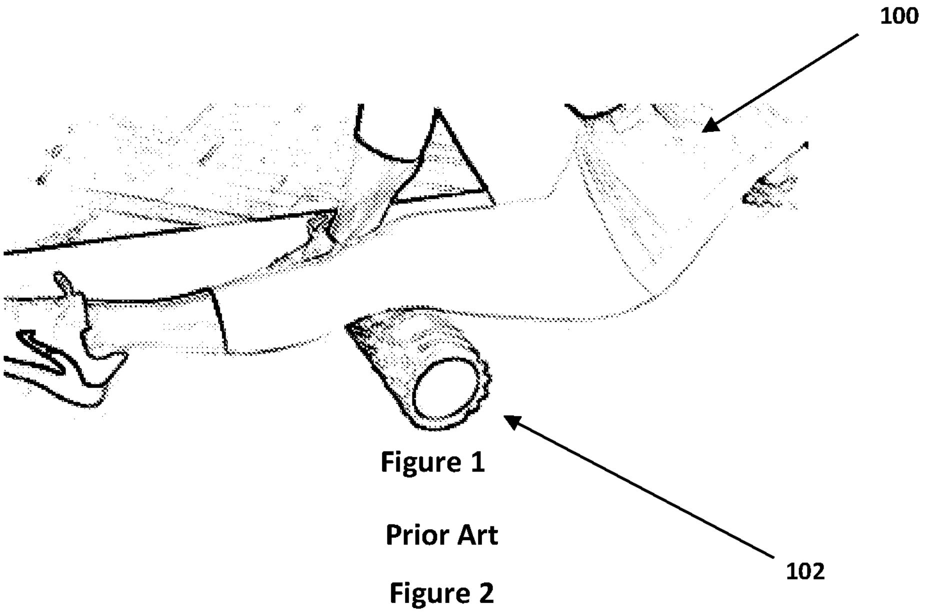
Figure 1
Prior Art
Figure 2
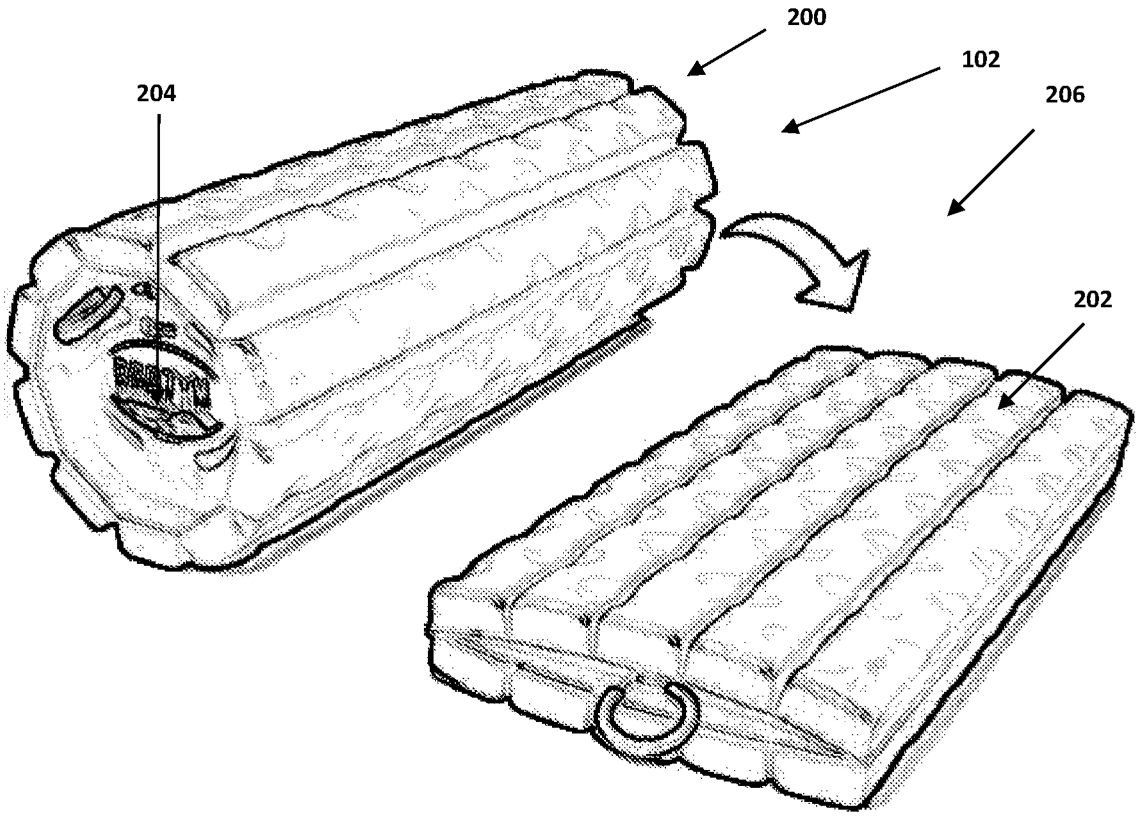

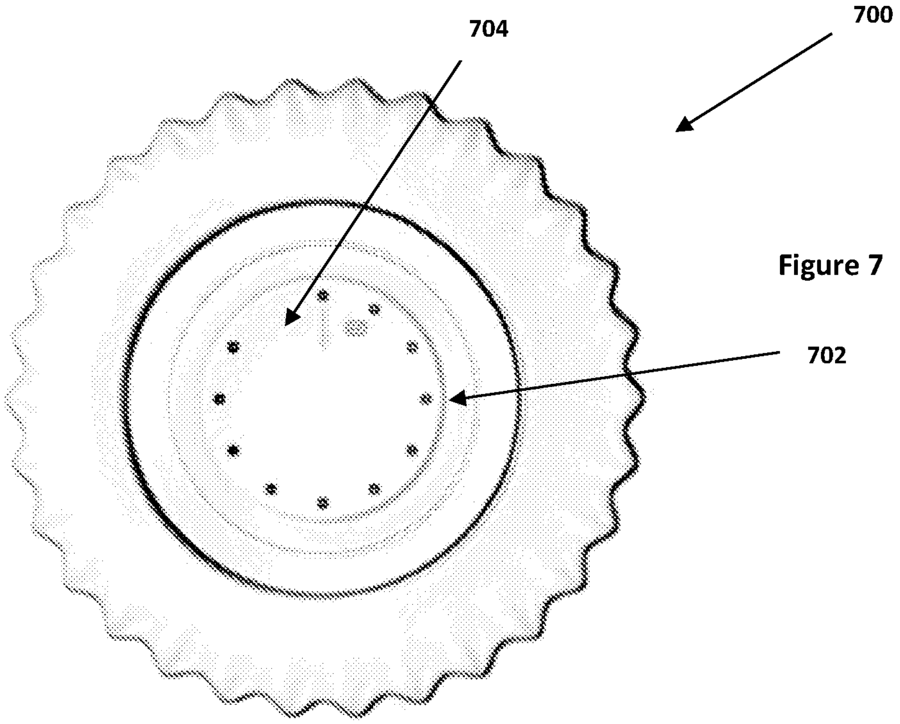
Figure 7
Figure 8

ARAY HEATED ROLLER

CROSS-REFERENCE TO RELATED APPLICATIONS

This application claims priority to U.S. Provisional patent applications Ser. No. 63/111,245 titled "ARAY Heated Roller", filed on Nov. 9, 2020, Ser. No. 63/147,978 titled "ARAY Heated Roller", filed on Feb. 10, 2021, and is a Continuation-in-Part of Ser. No. 16/559,303 titled "Foam Roller Pad Wrapper", the disclosure of all herein incorporated by reference in their entirety.

PATENTS CITED

The following documents and references are incorporated by reference in their entirety, Wahl (U.S. Pat. Pub. No. 2011/0152035), Barrows (U.S. Pat. No. 7,137,926), Barrows (U.S. Pat. No. 9,968,513), Godfrey (U.S. Pat. No. 8,500,663), Rocklin et al (U.S. Pat. Pub. No. 2017/002074), Chang (KR 101899783), Leng (CN 105561541) and Lamoth (WO 2020/198880).

FIELD OF THE INVENTION

The present invention relates to an apparatus, system and method for application of heat from a cylindrical object, and particularly to an exercise foam roller capable of transmitting stored cold and/or generated heat to the user.

DESCRIPTION OF THE RELATED ART

Foam rollers are a tried and trusted way for athletes to keep muscles healthy and elastic, as well as to aid recovery and reduce tension. They have become extremely popular for use by fans of exercise, particularly as a way to unwind from a yoga session, or to nurse an injury, ache or pain. Initially, they were made from a cylinder-shaped mass of Expanded Polypropylene plastic (EPP). This gives the foam a firm consistency, yet having a bit of 'give'. For more 'give', some modern foam rollers have a bamboo or metal collapsible frame having a Polyurethane Foam (PF) 'skin'. PF is commonly used for furniture padding.

In both cases, it is possible to remove the 'core' of the foam roller, and insert a vibration source (typically battery powered) so as to provide a soothing massage to the user. It would also be fantastic to include a thermal source (heat) or thermal sink (cold) in order to provide the muscle with relief.

Unfortunately, as foam is an insulating material, the effect of any heat/cold contained within said foam roller is minimized, the farther it has to travel across the foam layer, since the foam would prevent the heat from travelling. It is imperative to bring the heat/cold source as close to the surface of the 'foam' layer as possible. This is fairly easy to accomplish with cold, by using an ice or cold pack that is flexible and is cooled/frozen before each use.

The best reusable heat source is one that depends on a self-contained battery that heats a resistive mesh. Unfortunately, when such a mesh is used, and placed near the surface of the foam layer, repeated flexing of the electrically conducive layer occurs, resulting in broken electrical paths. Thus, there is a need to have a heat mesh material that can repeatedly flex without losing the electrical path that creates the resistive heat generating layer.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a portable heated roller for therapeutic exercise, comprising: an inner core housing containing energy storage components and electronic control components, a heating component layer surrounding said core and an outer foam layer surrounding said heating component layer, said outer foam layer having external shapes and features. In another aspect, said heating component layer is comprised of: an inner foam layer surrounding said inner core, a middle heat shield layer surrounding said inner foam and an outer heating element layer. In yet another aspect said heating element layer is comprised of an electrical multi-path structure having one or more resistive paths for electrical current to travel through. In another aspect one or more ends of said portable roller has an open ended dome structure. In yet another aspect one or more of said open ended dome structures provide access to user controls and one or more of said open ended dome structures provide access to inner core energy re-charging components.

Other features and advantages of the present invention will become apparent upon examining the following detailed description of an embodiment thereof, taken in conjunction with the attached drawings, which are provided for purposes of illustration and not of limitation.

BRIEF DESCRIPTION OF THE DRAWINGS

FIGS. 1-3 illustrate the typical foam roller, according to the prior art.

FIGS. 6-7 show top views of the ARAY roller, according to exemplary embodiments of the invention.

FIG. 8 shows a side view of the ARAY roller, according to an exemplary embodiment of the invention.

Figure 3:
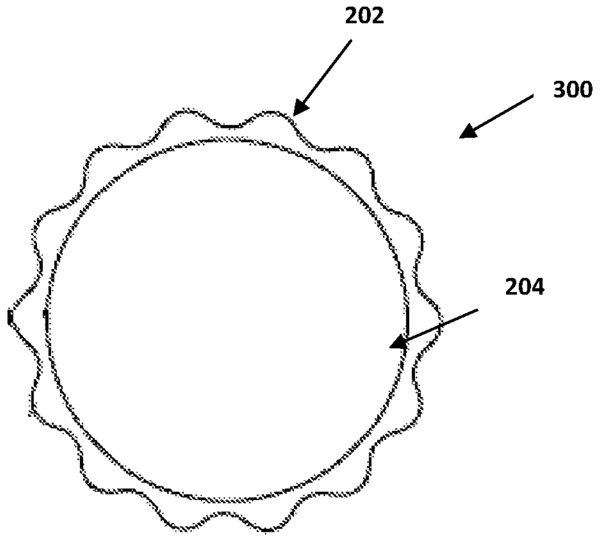
Figure 3 Prior Art
Figure 4:
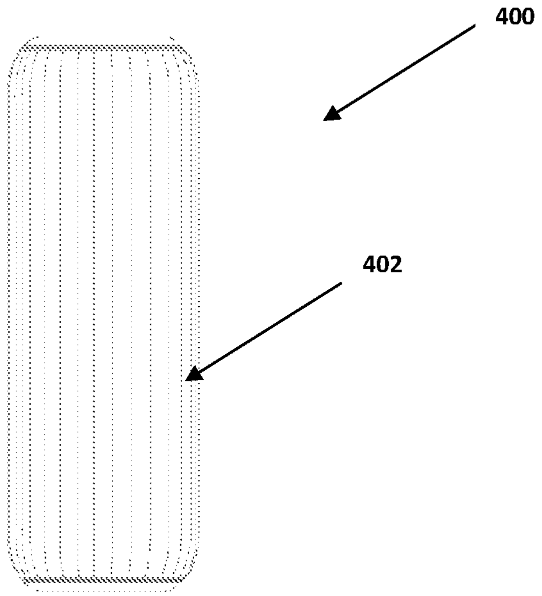
FIG. 4 shows a perspective view of the ARAY roller while standing on an end, according to an exemplary embodiment of the invention.
Figure 5:
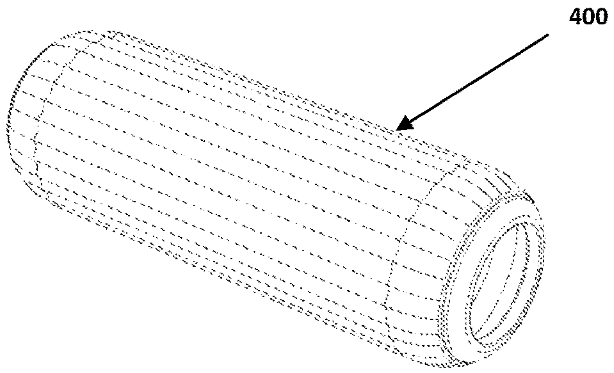
FIG. 5 shows a perspective view of the ARAY roller while laying on the side, according to an exemplary embodiment of the invention.
Figure 6:
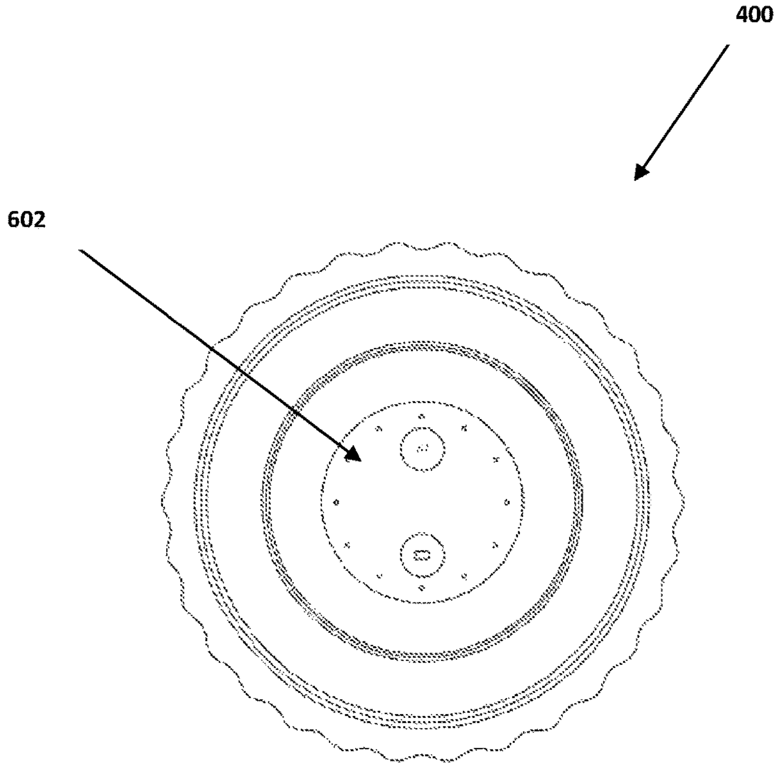
Figure 9:
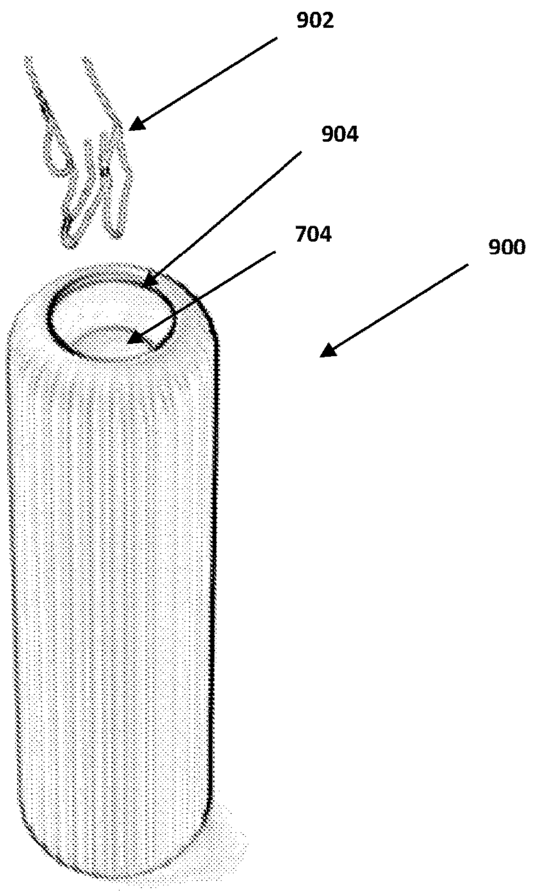
FIG. 9 shows a top perspective view of the ARAY roller, highlighting the pick-up rim, according to an exemplary embodiment of the invention.
Figure 10:
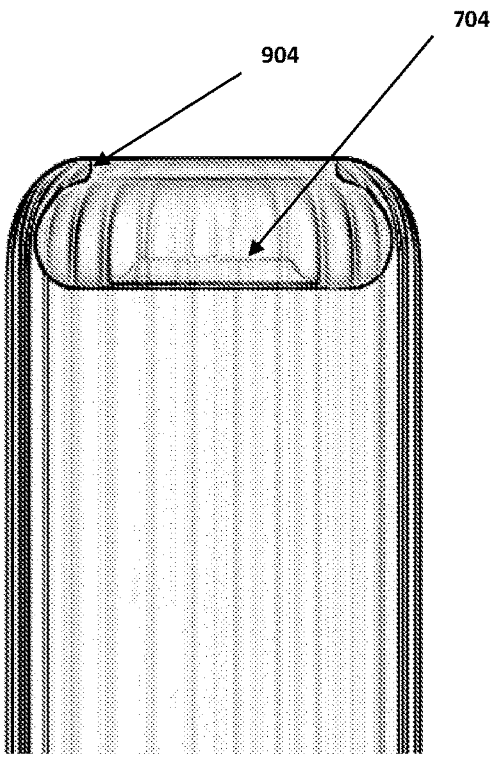
FIG. 10 shows a side view cutaway of the ARAY roller top with a cutout showing the pick-up rim, according to an exemplary embodiment of the invention.
Figure 11:
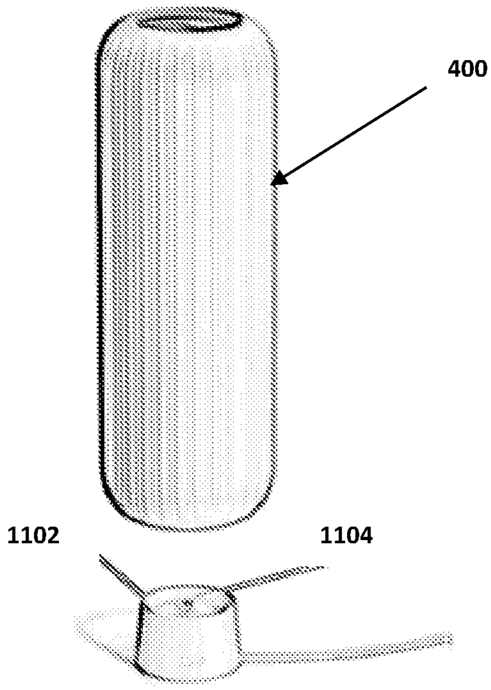
FIG. 11 shows a side view of the ARAY roller and the recharge base, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms “a”, “an” and “the” include plural references unless the context clearly dictates otherwise. For example, the term “a transaction” may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words “lower,” “upper,” “bottom,” “top,” “front,” “back,” “left,” “right” and “sides” designate directions in the drawings to which reference is made, but are not limiting with respect to the orientation in which the modules or any assembly of them may be used.

Referring to FIGS. 1-3 we see 100/200/300 prior art examples of a foam roller 102, in this case a collapsible one (206), which may have the hollow core 204 fitted with an internal vibration pod. The surface of the roller 102 has a number of ridges 202 formed by the absence/presence of material. The side view 300 magnifies the core 204 surrounded by these ridges 202, and how it creates a surface rippling that may go from very sharp to almost smooth (in different models), as preferred by the user.

If one would like to provide either heat or cold to the user’s skin and muscles, a first solution would be to place a heat or cold source within the ‘core’ 204 or central area of the unit. Of course, the foam (a suspension of gas particles within a plastic matrix structure), creates a natural insulating barrier (against heat or cold). Since the various gas cavities tend to be isolated, the heat/cold must cross a succession of such cavity/plastic structures until reaching the outer layer. Simply stated, placing ice within the cavity would simply create a great ice preserving cooler, cold inside but not outside (where the user skin that needs to be cooled is!).

In one embodiment, what applicant proposes (FIGS. 4-23) is to solve this (primarily for heat) by creating the ARAY heated roller 400/1306, a portable heated roller for therapeutic exercise formed from an inner core 1302 housing containing re-chargeable energy storage and control components (such as batteries, power cells or others) surrounded by a flex-resistant resistive heating layer topped by a therapeutic shaped foam overmold 402. The above combination provides a use resistant unit that is both convenient and effective over a long period of time.

ARAY is a fitness and recovery partner for the modern home fitness lifestyle. The ARAY Heated Roller is designed and engineered to tune and prepare the body for workouts, plus aid in faster muscle recovery. With even-heating technology, the ARAY Heated Roller provides penetrating relief, and an indulgent respite from the stresses of everyday life.

The ARAY is a foam roller (outside a hard core), having the right texture and firmness. At one or more ends, a grip assistive shape allows for easy carry, particularly by small-handed individuals.

Internal energy storage components (batteries, fuel cells, etc.) may be re-chargeable and controlled via either on-device controls (such as a knob or finger control at one end 602), or via a separate wireless (Bluetooth, Wi-Fi or similar) protocols to an App or a browser control. In both modes, the unit allows for the adjustment of the temperature (as an adjustment of the energy released to the heating components). As seen in 700, these may include charge level LEDs 702 on the side fascia 704 of the unit.

Carrying 900 the ARAY unit around may be hard for those with smaller hands 902, so significant thought has been given to using the ends of the unit (FIGS. 9-10) as internal carrying handles. This is accomplished by creating a partial open ended dome at one or both ends, so that users can pick up the unit 400 by lifting along the rim structure 904 of the dome opening.

Recharging of the internal energy storage components may be accomplished via USB or similar means (USB-C, Lightning or similar). An optional charging base (FIG. 11) may be used to both charge the unit (which nestles the connector to the make charger 1104 and keep it stored as it seats on the complementary molded base 1102. In another embodiment, the base 1102 provides wireless charging to the inner unit 400 recharge components.

Figure 12:
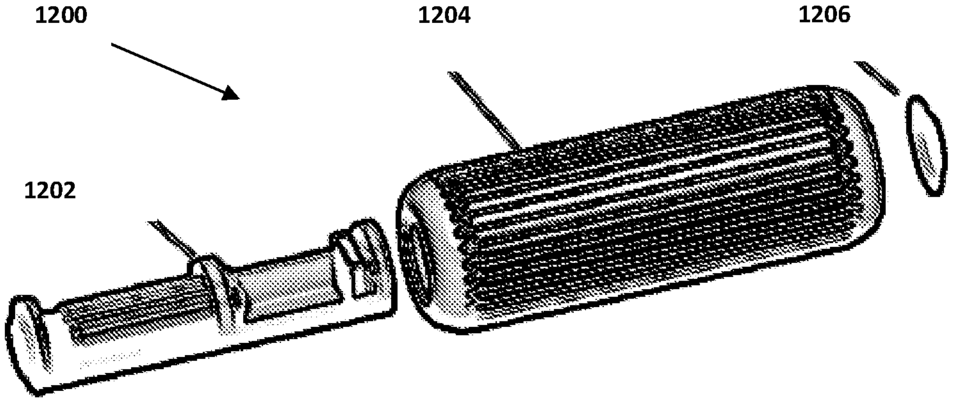
FIGS. 12-13 show exploded views of the ARAY roller main components, according to exemplary embodiments of the invention.
Figure 13:
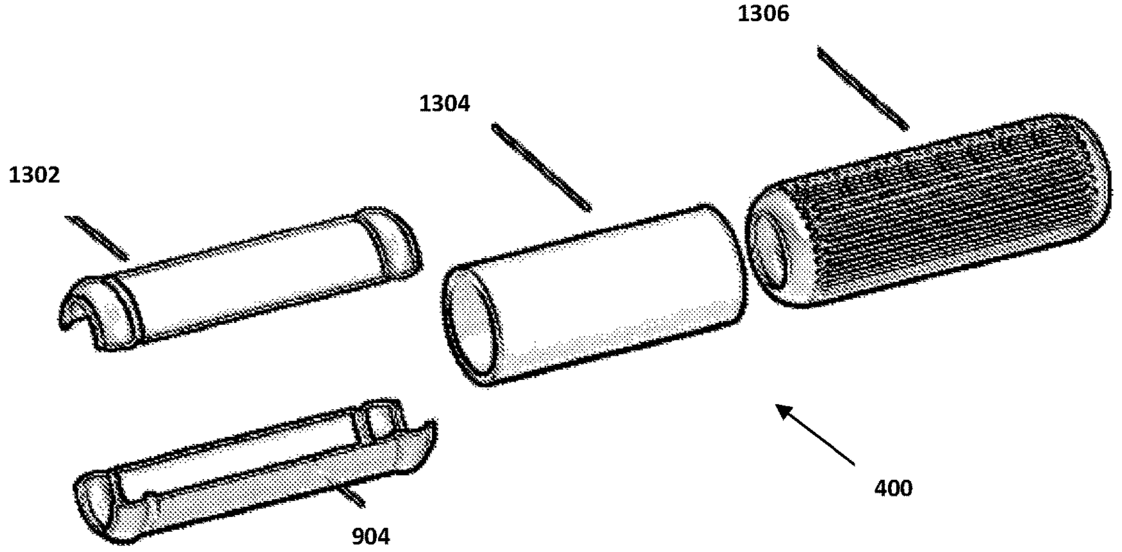
Figure 14:
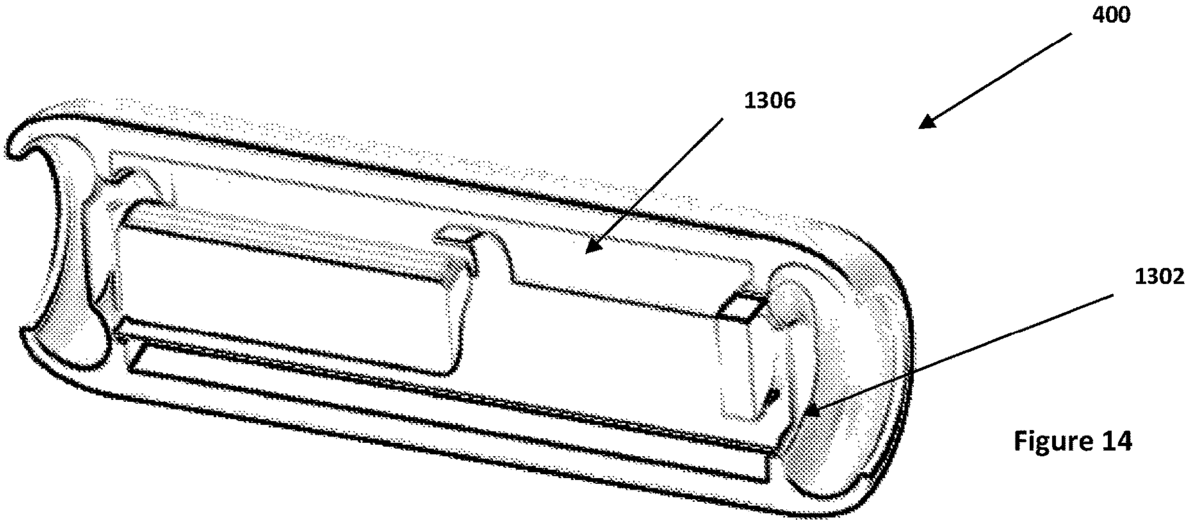
FIG. 14 shows a cutaway view of the core component of the ARAY roller, according to an exemplary embodiment of the invention.
Figure 15:
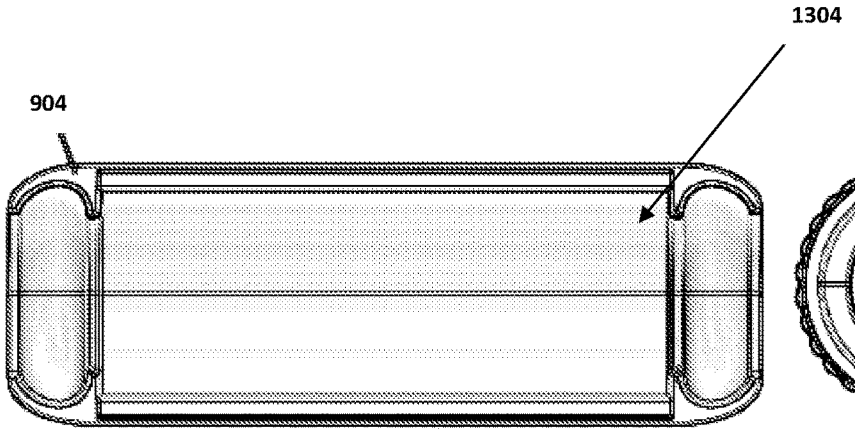
FIGS. 15-16 shows cutaway views of the ARAY roller core components, according to exemplary embodiments of the invention.
Figure 16:
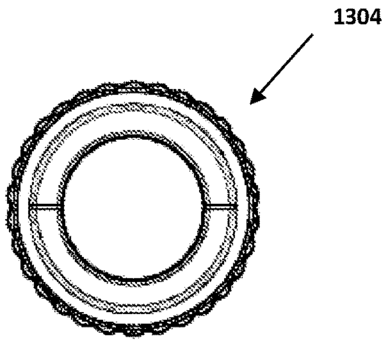
Figure 17:
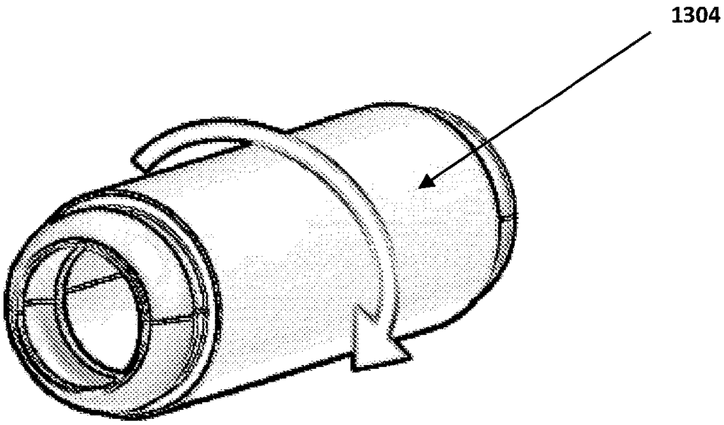
FIG. 17 shows the roller inner composite layer components wrapped around the ARAY roller core component, according to an exemplary embodiment of the invention.
Figure 18:
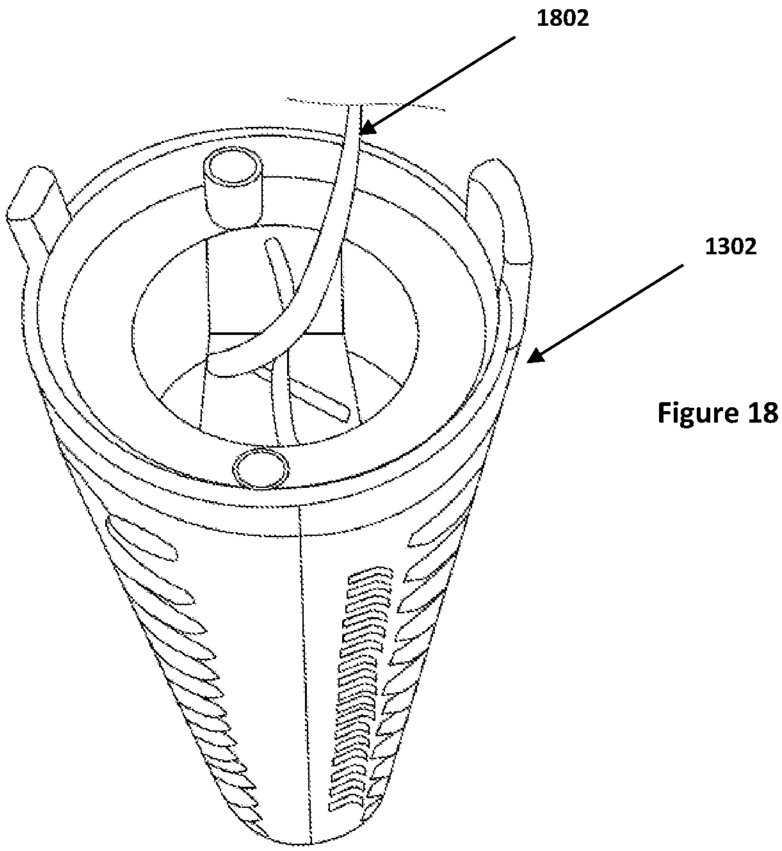
FIG. 18 shows a top view of the ARAY roller core component, according to an exemplary embodiment of the invention.
Figure 19:
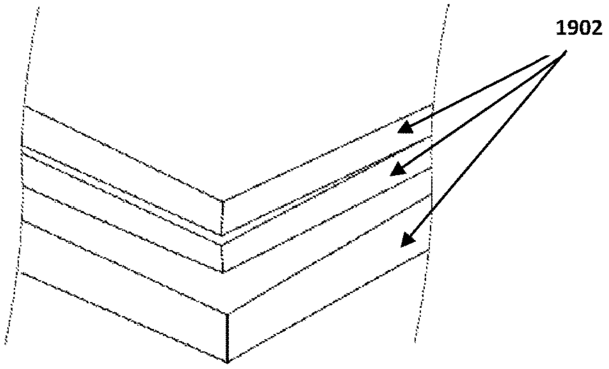
FIGS. 19-21 show components of the ARAY roller inner composite layer components, according to exemplary embodiments of the invention.
Figure 20:
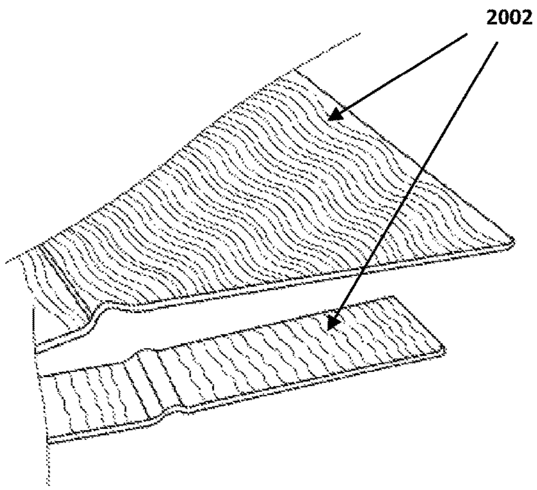
Figure 21:
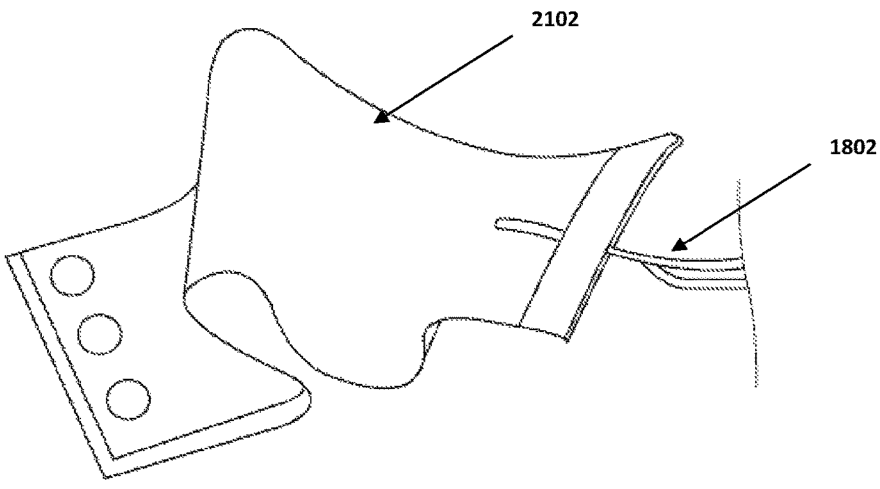
Figure 22:
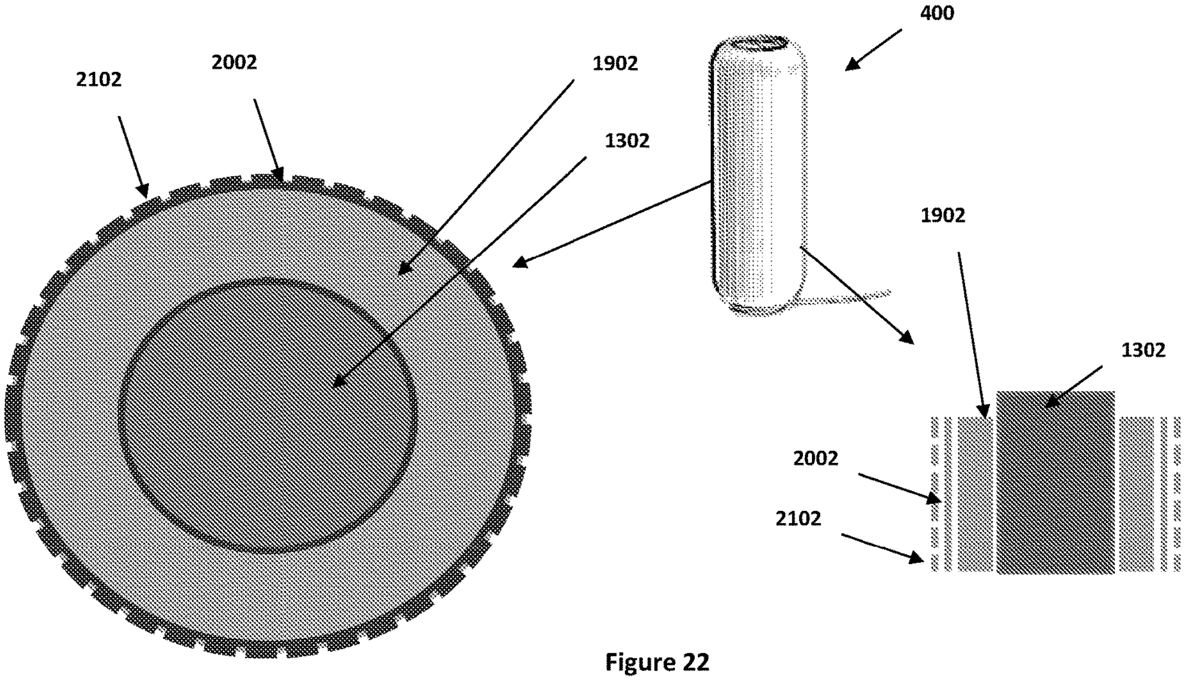
FIG. 22 shows a cutaway view of the ARAY roller core component, according to an exemplary embodiment of the invention.

In one embodiment, FIG. 12, we see two of the ARAY components. The inner core 1202 provides cushioning and massaging feel and has a rigid support shape that may be easily mfd. using extrusion, injection molding or any additive mfg. such as 3D printing. Within the inner core 1202 we find energy storage components, energy recharge components, control electronics, user communication components (both wireless, display and interconnect).

A middle layer 1204 is formed from a composite of materials, including the heat generating layer and the foam layer. One or more cosmetic end caps 1206 may be used. Said end caps 1206 may even have rings or other suitable carrying components.

In another embodiment 1300 (FIG. 13) the inner core 1302 is smooth (and forms the open dome carrying rim structure 904 at either or both ends), contains the electronics and energy components within. A composite layer forms a heating component layer 1304 (See FIGS. 22, 24 below) that surrounds said core 1302 and are electrically connected to the control circuitry and power source within said core 1302. A final exterior foam layer 1306 (which may have many external shapes) covers the whole assembly 400. In another embodiment, the outer layers sandwich the electrical heating layer or the heating layer is embedded into the outer layer via co-molding or another embedding process.

While heating may be accomplished through traditional electrical resistive approaches, a significant limitation for the unit is that their use will include the natural flexing of the heating component layer 1304 around the core 1302, causing potential breaking of the electrical paths, which in effect results in electrical discontinuity. It is easy to envision a fold or notch in the heating component layer 1304 when pressed by the user, resulting in the cut, fraying or otherwise interruption of the electrical path within the heating element.

In one embodiment, the heating element is preferred to be embodied in an electrical multi-path structure that would allow minor folds or other breaks to be bypassed at other locations. Such a structure, with no single failure resistive paths provides a longer lasting product. This may be accomplished by Carbon filled polymer structures. In another embodiment, it may be accomplished with carbon fiber wire heaters.

In one embodiment, the heating element is preferred to be embodied in an electrical multi-path structure (that is, a structure having one or more resistive paths for current to travel through) that would allow minor folds or other breaks to be bypassed at other locations. Such a structure, with no single failure resistive paths provides a longer lasting product. This may be accomplished by Carbon filled polymer structures. In another embodiment, it may be accomplished with carbon fiber or other resistive wire heaters or other heating element technologies.

In one embodiment, the heating component layer 1304 is comprised of a composite of layers 2200 (FIGS. 18-22), an outer heating element layer 2102 (electrically connected 1802 to the control electronics and power source components within the core 1302) that surrounds all or part of a heat shield layer 2002, said heat shield surrounding all or part of a base foam pad 1902. This layer 1304 is wrapped around the core 1302.

In one embodiment, the heating element layer 2102 may be accomplished through the use of a Carbon filled polymer structures with multi electrical built-in paths such as the EXO2's FabRoc™ and ThermoKnitt™ materials. The EXO2 material would add the unique ability to have a base polymer material having a matrix of conductive particles laid between two electrodes, so that when the voltage from the internal energy sources is applied (preferred DC, but AC may also be used) to the FabRoc™ core, the heat is felt by the user.

Figure 23:
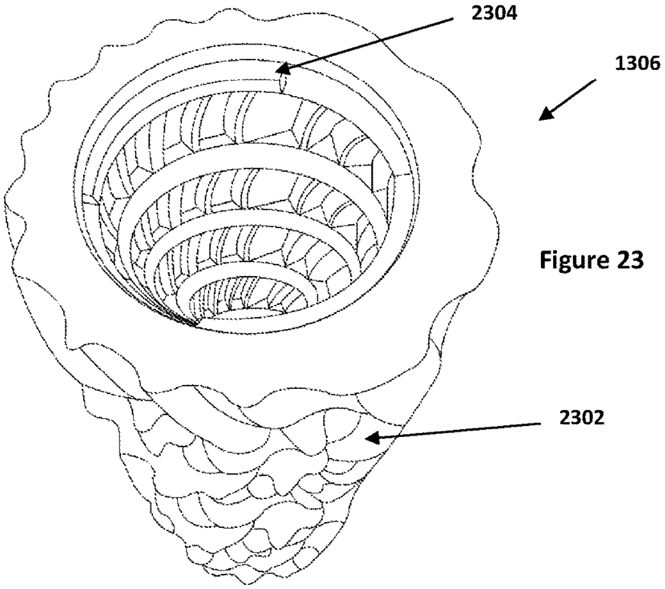
FIG. 23 shows a perspective view of the ARAY roller foam overmold component, according to an exemplary embodiment of the invention.
Figure 24:
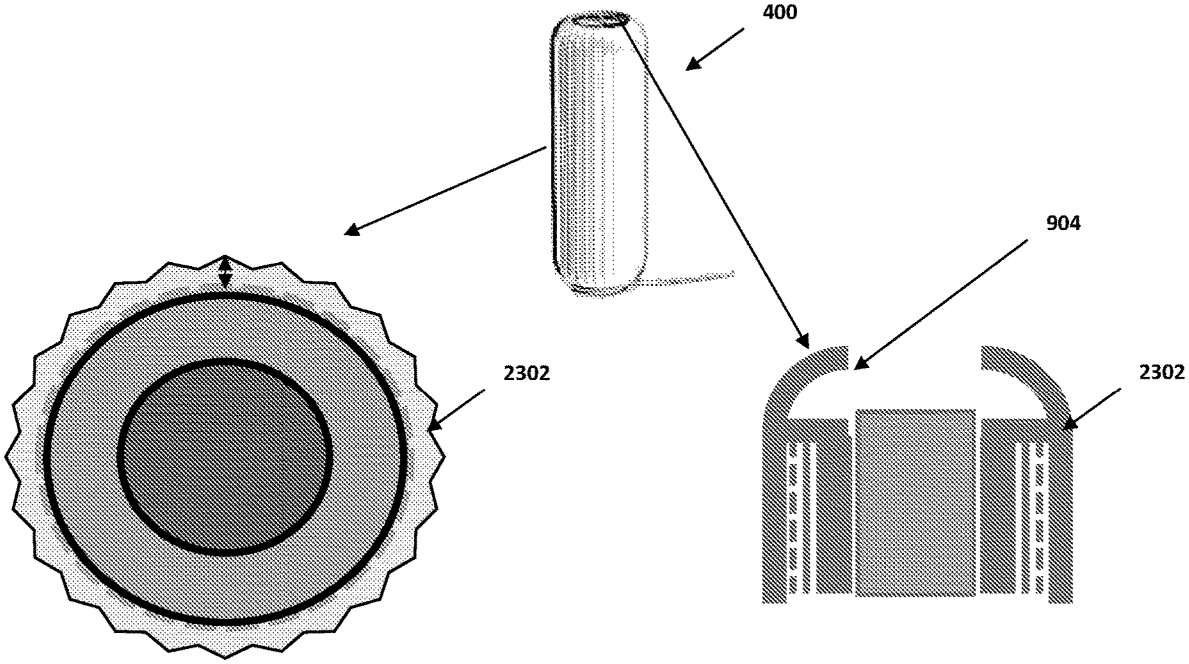
FIG. 24 shows a cutaway view of the ARAY roller components including the fitted foam overmold, according to an exemplary embodiment of the invention.

As seen in FIGS. 23-24, in one embodiment the unit is finished by surrounding it with an outer foam layer 1306, which may have any suitable external shape 2302 and features. This foam layer 1306 may be extruded or poured into shape. In one embodiment, an inner loop 2304 of tension material (such as wire of other suitable material) is used to create tension for the foam layer 1306 around the core 1302. In one embodiment, the heat shield 2002 may be attached to the inside of the foam layer 1306 using adhesive or could be co-molded.

The heating component layer 1304 placed outside the core 1302 and inside the foam layer 1306 provides a unique composite structure. To the user, it feels like a thicker and firmer foam pad that is warm. The composite layer sandwich 1902/2002/2102 allows for the heating element 2102 to be near the surface (so the foam won't be as effectively insulating the heat source, while at the same time providing some insulation to the core 1302), while the complete unit feels like a warm blob of foam. In one embodiment, significant material savings may be accrued by the use of lattice or gapped structures of the heating layer 2102.

In one embodiment, an end cap 1206, (not to be removable by a consumer) allows for the electronics core 1302 to be semi-permanently inserted into the roller assembly 400 and secured with fasteners or similar mechanical components as well as chemically sealed.

In another embodiment, the unit 400 is then assembled by first creating the clamshell core 1302 from two halves, and joining their lap joint between the two shells, so that the cross ribs provide a stronger structure.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A portable heated roller for therapeutic exercise, comprising:

an inner core housing containing energy storage components and electronic control components;

a heating component layer surrounding said core;

wherein said heating component layer is comprised of an inner foam layer surrounding said inner core, a middle heat shield layer surrounding said inner foam and an outer heating element layer surrounding said heat shield; and an outer solid foam layer surrounding said heating component layer, said outer foam layer having external shapes and features.

2. The portable roller of claim 1 wherein:

said inner foam layer is thicker than said outer foam layer;

said heat shield layer is a heat reflector;

said outer foam layer external shapes and features include peaks and valleys.

3. The portable roller of claim 2 wherein:

said heating element layer is comprised of an electrical multi-path structure having one or more resistive paths for electrical current to travel through.

4. The portable roller of claim 3 wherein:

one or more ends of said portable roller has an open ended dome structure.

5. The portable roller of claim 4 wherein:

one or more of said open ended dome structures provide access to user controls; and one or more of said open ended dome structures provide access to inner core energy re-charging components.

6. The portable roller of claim 2 wherein:

one or more ends of said portable roller has an open ended dome structure.

7. The portable roller of claim 6 wherein:

one or more of said open ended dome structures provide access to user controls; and one or more of said open ended dome structures provide access to inner core energy re-charging components.

* * * * *